United States Patent
Lynch

(10) Patent No.: US 9,639,979 B2
(45) Date of Patent: May 2, 2017

(54) METHOD AND APPARATUS FOR GENERATING A COMPOSITE IMAGE BASED ON AN AMBIENT OCCLUSION

(71) Applicant: Here Global B.V., Veldhoven (NL)

(72) Inventor: James D. Lynch, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 81 days.

(21) Appl. No.: 14/574,993

(22) Filed: Dec. 18, 2014

(65) Prior Publication Data

US 2016/0180580 A1  Jun. 23, 2016

(51) Int. Cl.
*G06T 17/05* (2011.01)
*G01C 21/36* (2006.01)
*G06T 15/50* (2011.01)

(52) U.S. Cl.
CPC .......... *G06T 17/05* (2013.01); *G01C 21/3638* (2013.01); *G06T 15/50* (2013.01)

(58) Field of Classification Search
CPC ..... G06T 15/04; G06T 19/00; G06T 2215/16; G06T 7/0051; G06T 15/06; G06T 15/40; G06T 15/50; G06T 15/506; G06T 15/80; G06T 5/50; G06T 7/174; G06T 7/73; G06T 11/001; G06T 15/10; G06T 15/60; G06T 5/008; G06T 7/194; G06F 17/30047

See application file for complete search history.

(56) References Cited

U.S. PATENT DOCUMENTS

| | | | |
|---|---|---|---|
| 8,761,457 B1 * | 6/2014 | Seitz | G06T 7/0028 382/113 |
| 8,811,764 B1 * | 8/2014 | Hsu | G06T 3/40 382/260 |
| 2009/0110267 A1 | 4/2009 | Zakhor et al. | |
| 2009/0141966 A1 | 6/2009 | Chen et al. | |
| 2010/0080458 A1 * | 4/2010 | Tam | G06T 7/0051 382/154 |
| 2011/0018876 A1 * | 1/2011 | Nankervis | G06T 15/40 345/426 |
| 2014/0253538 A1 * | 9/2014 | Bailiang | G06T 15/08 345/419 |
| 2014/0277939 A1 | 9/2014 | Ren et al. | |
| 2015/0187129 A1 * | 7/2015 | Sloan | G06T 1/60 345/426 |

OTHER PUBLICATIONS

European Patent Office, Extended European Search Report for Application No. 15200825.6, Apr. 20, 2016, 8 pages, Germany.

* cited by examiner

*Primary Examiner* — Haixia Du
(74) *Attorney, Agent, or Firm* — Alston & Bird LLP

(57) ABSTRACT

A method, apparatus and computer program product are provided for non-occluding overlay of user interface or information elements on a contextual map. A method is provided including receiving a two dimensional image associated with a geographic area or object, receiving geometry model associated with the associated with the geographic area, generating an embossing map based on ambient occlusions associated with the geometry model, and generating a composite image based on the two dimensional image and the embossing map.

20 Claims, 27 Drawing Sheets

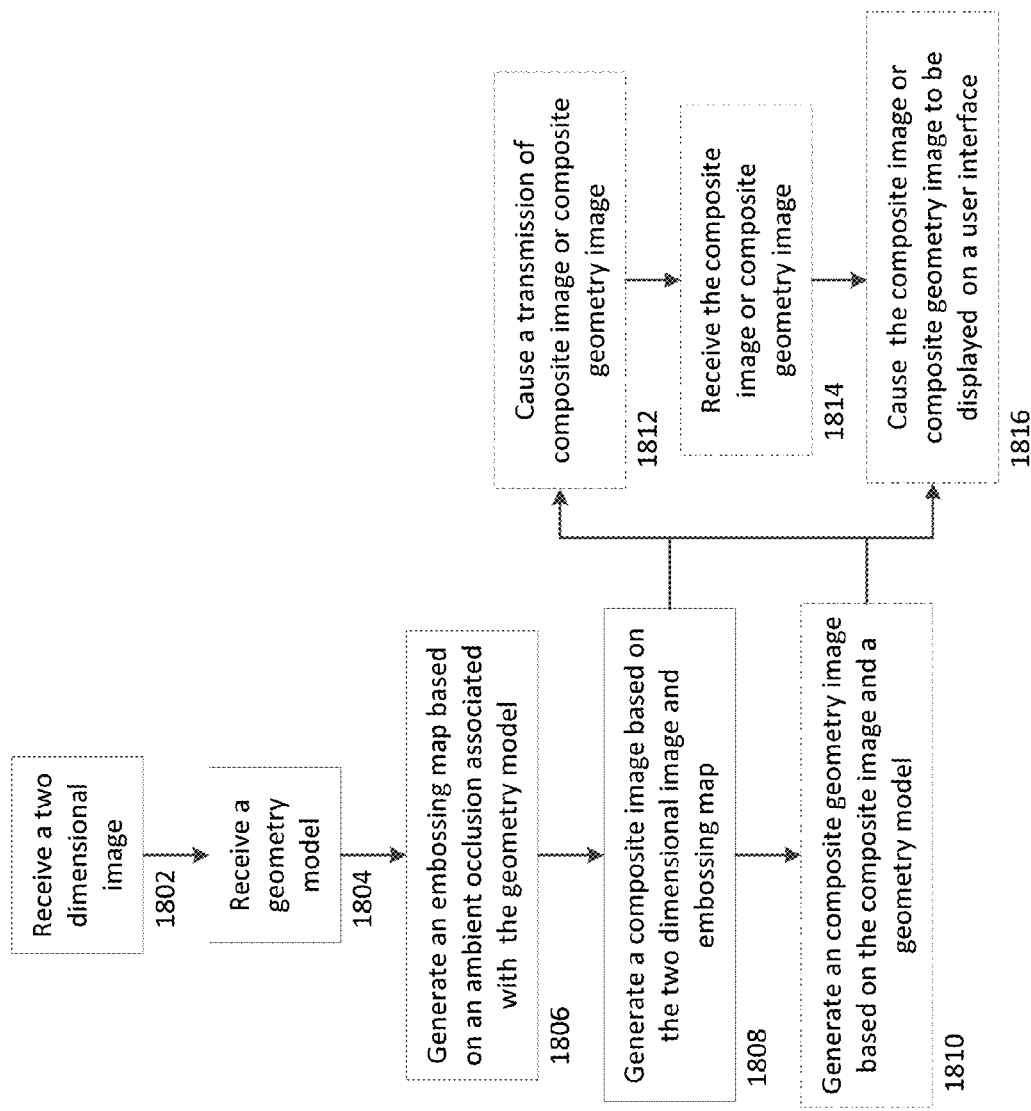

METHOD AND APPARATUS FOR GENERATING A COMPOSITE IMAGE BASED ON AN AMBIENT OCCLUSION

TECHNOLOGICAL FIELD

An example embodiment of the present invention relates to map rendering and, more particularly, to generating a composite image based on an ambient occlusion.

BACKGROUND

Typical methods of combining a standard two dimensional map or aerial image with a high definition (HD) three dimensional content map may produce less than desirable results. Typically, the three dimensional content is overlaid on the two dimensional images, such as a map or aerial image, which may obscure the two dimensional image. This may be particularly true in an instance in which the context map is a high definition (HD) three dimensional road content map, due to the lane modeling and complex intersections. In these instances the road geometry is larger than the simple centerline road models.

In some examples, the two dimensional image and the three dimensional content may not align, for example the shape of the roads may differ slightly, even in idealized presentations. This misalignment may cause the transitions between the two dimensional image and the three dimensional content to be abrupt, detracting from the rendered map.

Further, in some instances the two dimensional image may contain too much detail, which may detract from the three dimensional content of the rendered map.

BRIEF SUMMARY

A method and apparatus are provided in accordance with an example embodiment for generating a composite image based on an ambient occlusion. In an example embodiment, a method is provided that includes receiving a two dimensional image associated with a geographic area or object, receiving a geometry model associated with the geographic area, generating, by a processor, an embossing map based on ambient occlusions associated with the geometry model and generating a composite image based on the two dimensional image and the embossing map.

In an example embodiment, the method also includes generating a composite geometry image based on the composite image and the geometry model. In some examples of this embodiment, the geometry model of the composite geometry image is semi-transparent. In some example embodiments of the method, generating the embossing map includes setting darkness values based on a height of surrounding regions of the geometry model.

In an example embodiment of the method, the geometry model is a three dimensional model. In some example embodiments of the method, the geometry model is a two dimensional model with a vertical layer offset. In an example embodiment of the method, generating the composite image preserves two dimensional image details.

In an example embodiment of the method, the geometry model comprises a geo-located road model. In some example embodiments of the method the geo-located road model comprises selected roads, and wherein the selected roads are associated with a height offset. In an example embodiment of the method, the selected roads are based on a selected drive route, road function class, or a road attribute.

In some example embodiments of the method, the geometry model comprises a geo-located building model. In an example embodiment of the method, the geometry model is based on a non-orthogonal viewpoint In another example embodiment, an apparatus is provided including at least one processor and at least one memory including computer program code, with the at least one memory and computer program code configured to, with the processor, cause the apparatus to at least receive a two dimensional image associated with a geographic area or object, receive a geometry model associated with the geographic area, generate an embossing map based on ambient occlusions associated with the geometry model, and generate a composite image based on the two dimensional image and the embossing map.

In an example embodiment the at least one memory and the computer program code, of the apparatus, are further configured to generate a composite geometry image based on the composite image and the geometry model. In some example embodiments of the apparatus, the geometry model of the composite geometry image is semi-transparent. In an example embodiment of the apparatus, generating the embossing map includes setting darkness values based on a height of surrounding regions of the geometry model.

In some example embodiments of the apparatus, the geometry model is a three dimensional model. In an example embodiment of the apparatus, the geometry model is a two dimensional model with a vertical layer offset. In some example embodiments of the apparatus, generating the composite image preserves two dimensional image details.

In an example embodiment of the apparatus, the geometry model comprises a geo-located road model. In some example embodiments of the apparatus the geo-located road model comprises selected roads, and wherein the selected roads are associated with a height offset. In an example embodiment of the apparatus, the selected roads are based on a selected drive route, road function class, or a road attribute.

In some example embodiments of the apparatus, the geometry model comprises a geo-located building model. In an example embodiment of the apparatus, the geometry model is based on a non-orthogonal viewpoint In a further example embodiment, a computer program product is provided including at least one non-transitory computer-readable storage medium having computer-executable program code portions stored therein, with the computer-executable program code portions comprising program code instructions configured to receive a two dimensional image associated with a geographic area or object, receive a geometry model associated with the geographic area, generate an embossing map based on ambient occlusions associated with the geometry model and generate a composite image based on the two dimensional image and the embossing map.

In an example embodiment the computer-executable program code portions, of the computer program product, further comprise program code instructions configured to generate a composite geometry image based on the composite image and the geometry model. In some example embodiments of the computer program product, the geometry model of the composite geometry image is semi-transparent. In an example embodiment of the computer program product, generating the embossing map includes setting darkness values based on a height of surrounding regions of the geometry model.

In an example embodiment of the computer program product, the geometry model is a three dimensional model.

In some example embodiments of the computer program product, the geometry model is a two dimensional model with a vertical layer offset. In an example embodiment of the computer program product, generating the composite image preserves two dimensional image details.

In an example embodiment of the computer program product, the geometry model comprises a geo-located road model. In some example embodiments of the computer program product the geo-located road model comprises selected roads, and wherein the selected roads are associated with a height offset. In an example embodiment of the computer program product, the selected roads are based on a selected drive route, road function class, or a road attribute.

In some example embodiments of the computer program product, the geometry model comprises a geo-located building model. In an example embodiment of the computer program product, the geometry model is based on a non-orthogonal viewpoint In yet a further example embodiment, an apparatus is provided including means for receiving a two dimensional image associated with a geographic area or object, means for receiving a geometry model associated with the geographic area, means for generating, by a processor, an embossing map based on ambient occlusions associated with the geometry model, and means for generating a composite image based on the two dimensional image and the embossing map.

In an example embodiment, the apparatus also includes means for generating a composite geometry image based on the composite image and the geometry model. In some example embodiments of the apparatus, the geometry model of the composite geometry image is semi-transparent. In an example embodiment of the apparatus, generating the embossing map includes setting darkness values based on a height of surrounding regions of the geometry model.

In an example embodiment of the apparatus, the geometry model is a three dimensional model. In some example embodiments of the apparatus, the geometry model is a two dimensional model with a vertical layer offset. In an example embodiment of the apparatus, generating the composite image preserves two dimensional image details.

In an example embodiment of the apparatus, the geometry model comprises a geo-located road model. In some example embodiments of the apparatus the geo-located road model comprises selected roads, and wherein the selected roads are associated with a height offset. In an example embodiment of the apparatus, the selected roads are based on a selected drive route, road function class, or a road attribute.

In some example embodiments of the apparatus, the geometry model comprises a geo-located building model. In an example embodiment of the apparatus, the geometry model is based on a non-orthogonal viewpoint

BRIEF DESCRIPTION OF THE DRAWINGS

Figure 1:
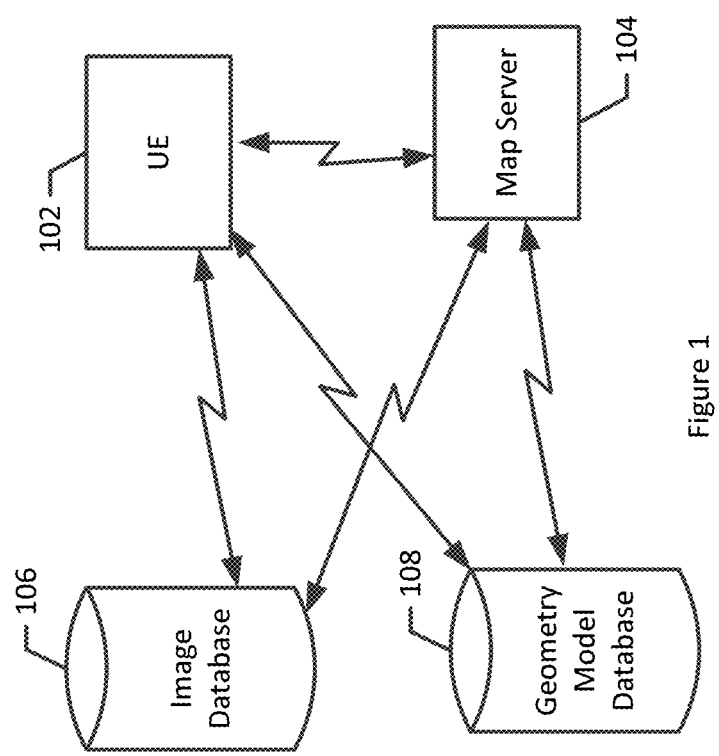
Figure 2:
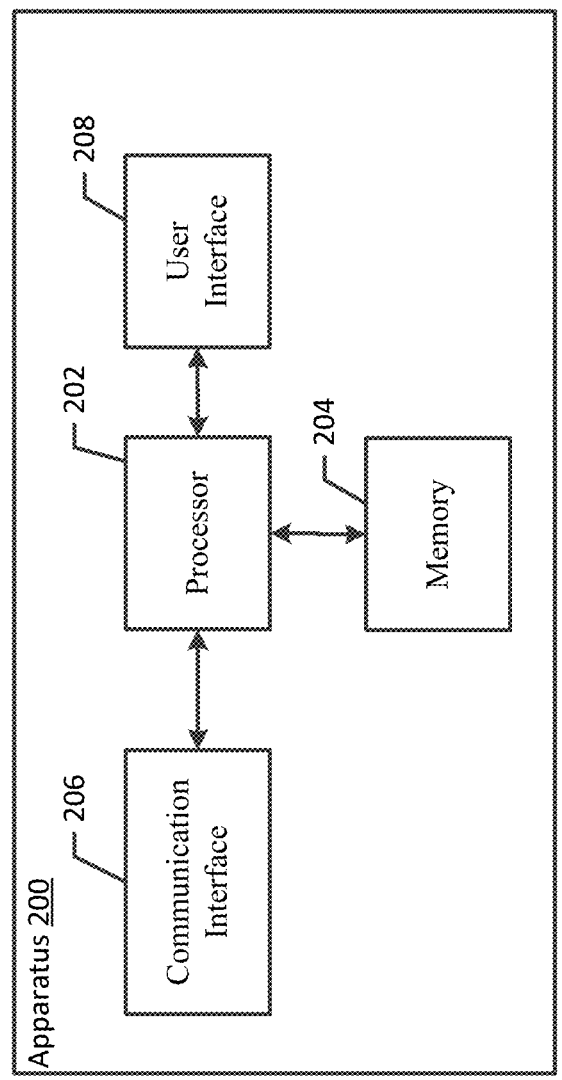
Figure 3A:
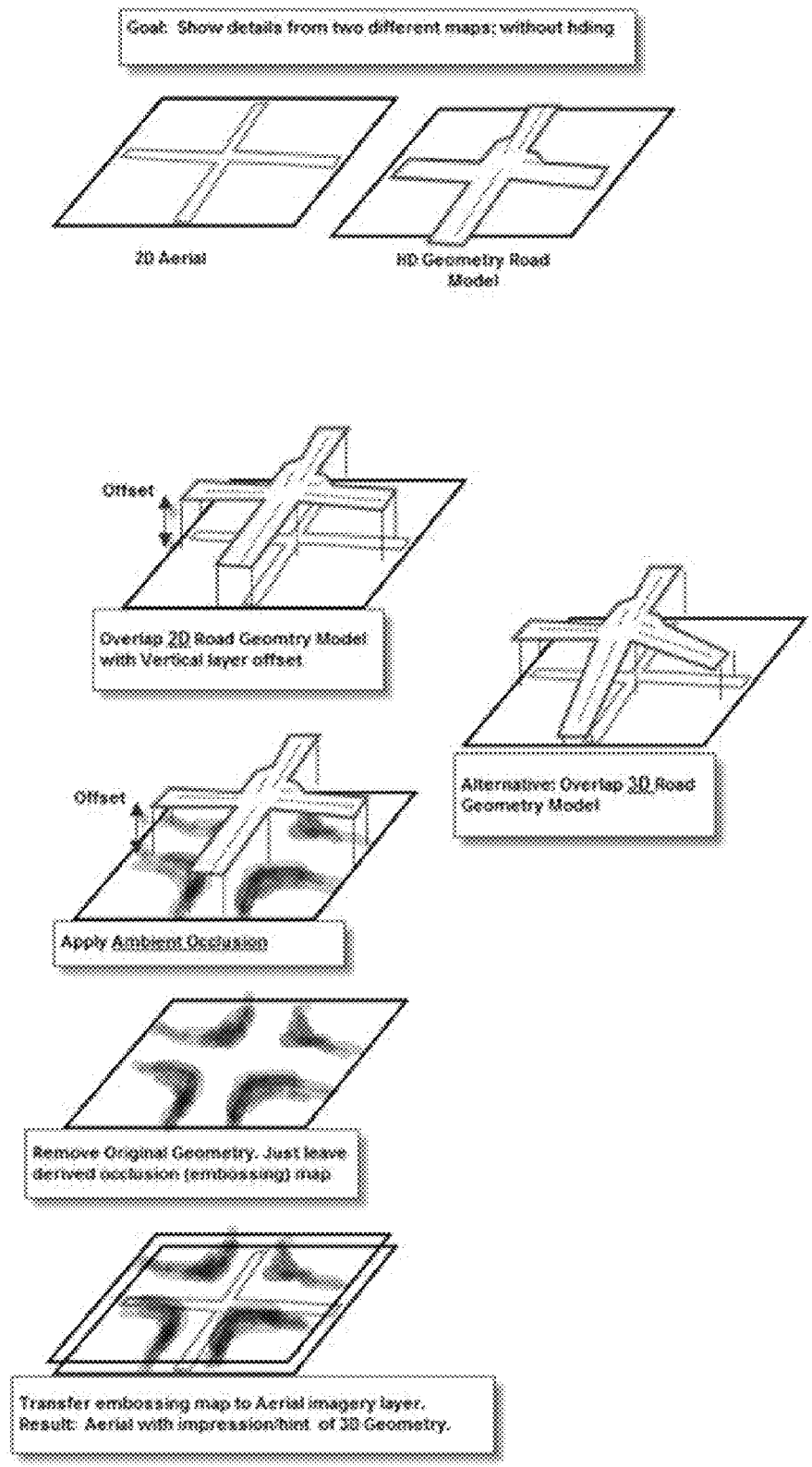
Figure 3B:
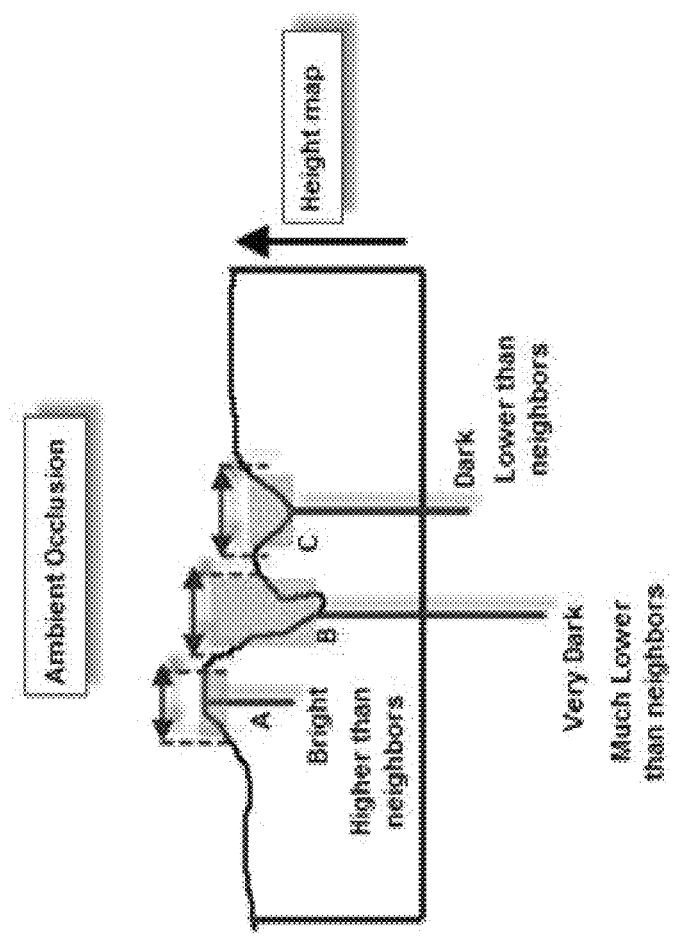
Figure 5:
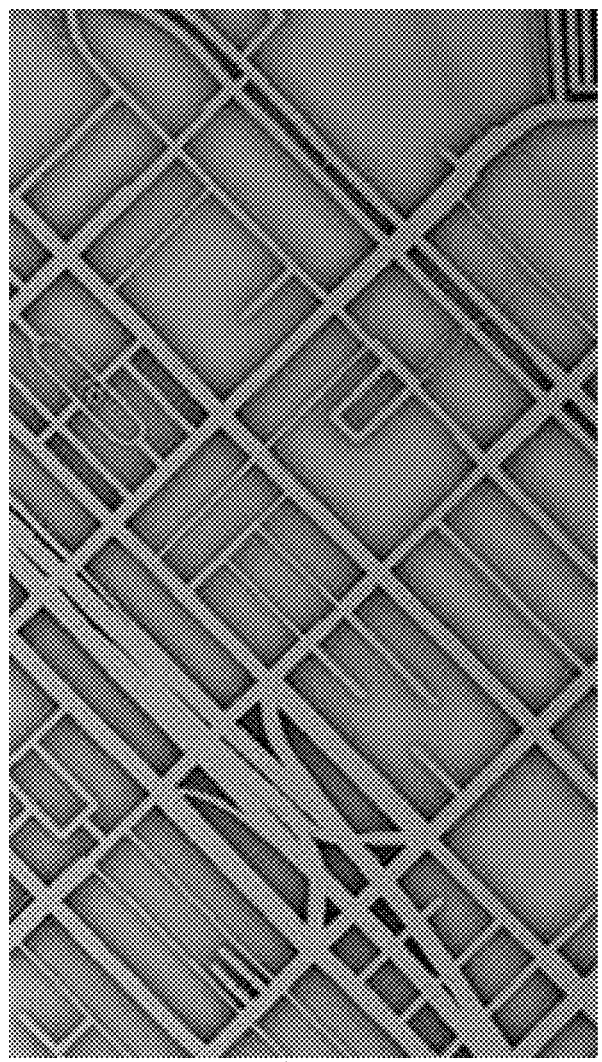
Figure 6:
Figure 7:
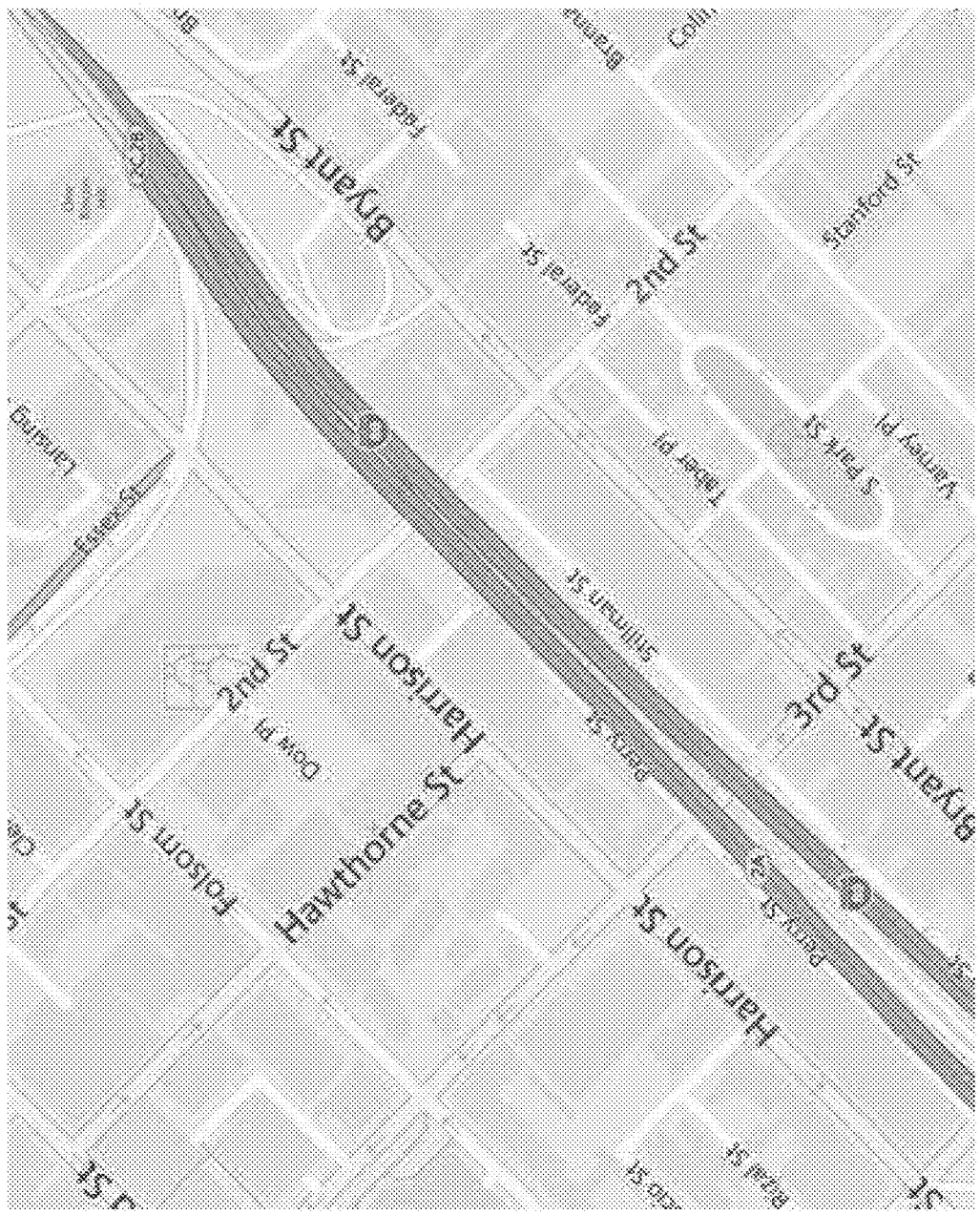
Figure 8:
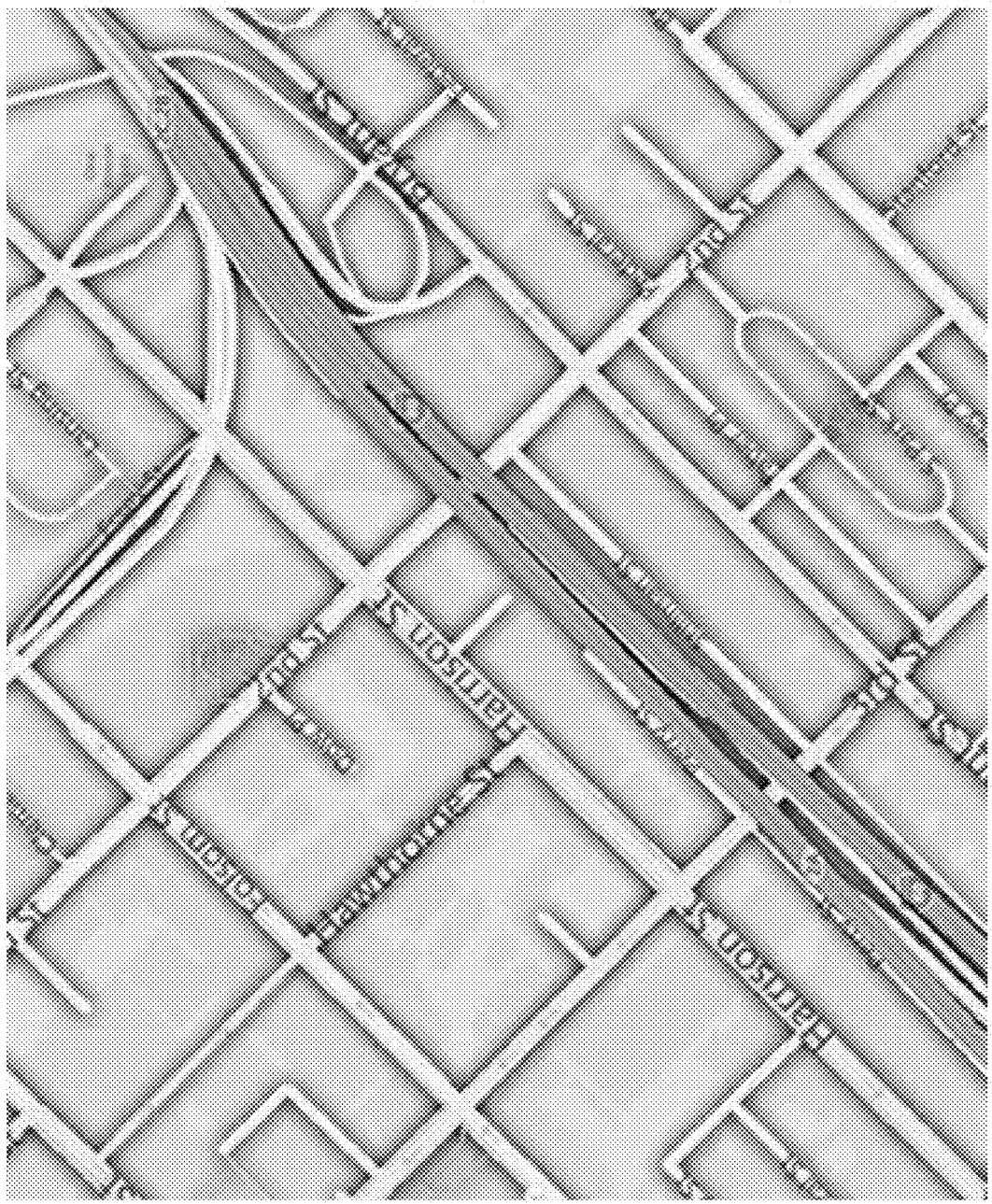
Figure 9:
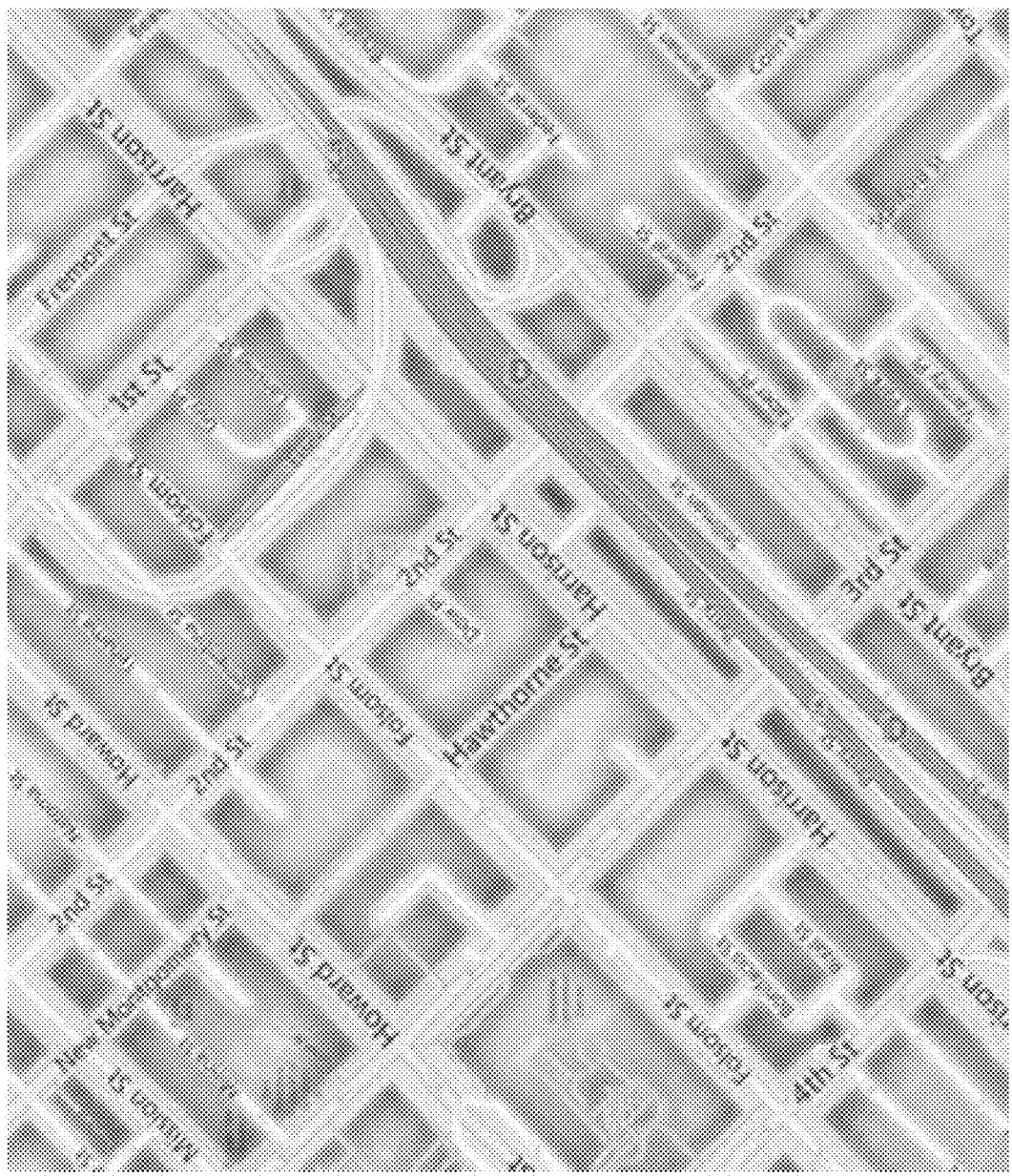
Figure 10:
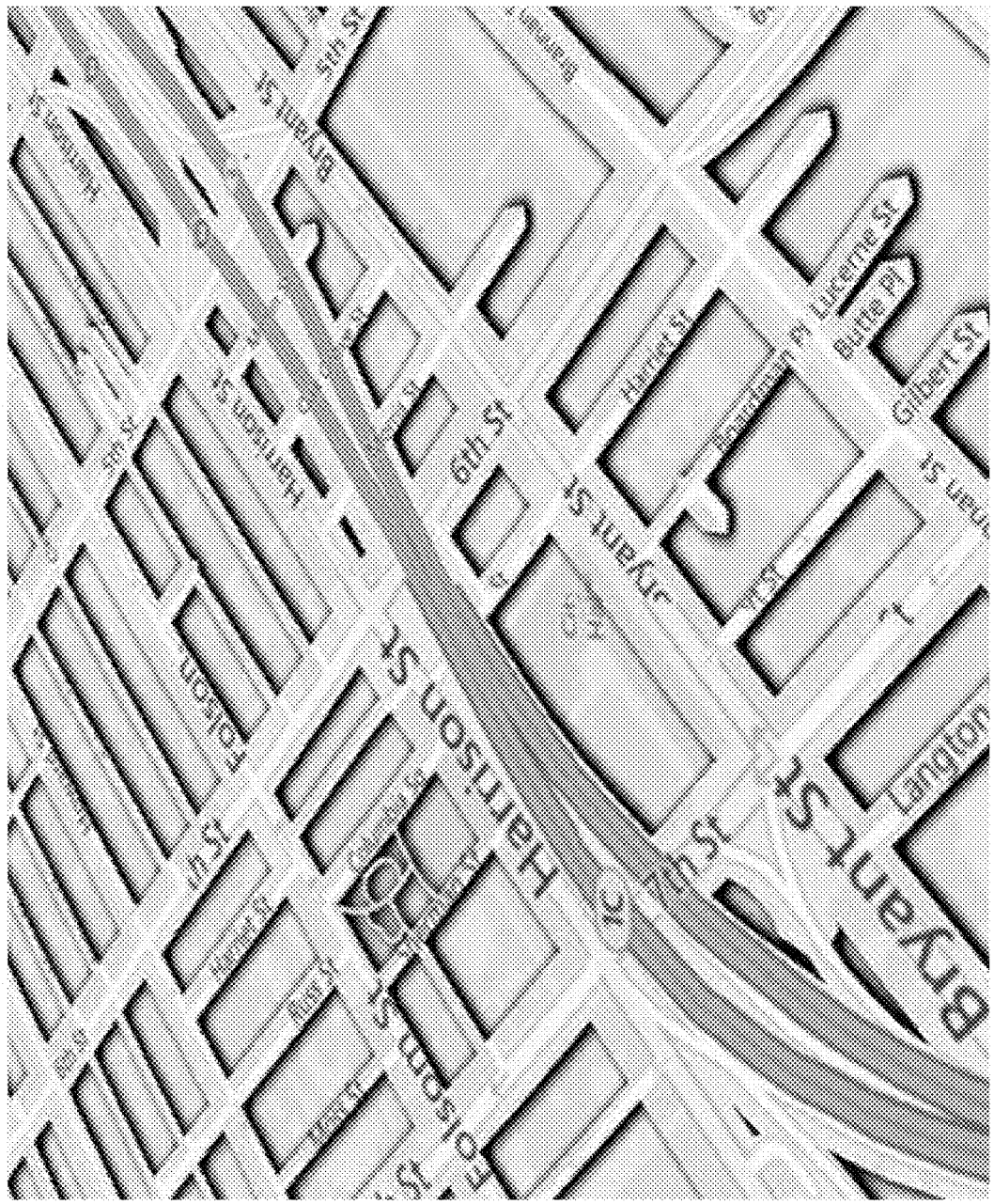
Figure 11A:
Figure 11B:
Figure 11C:
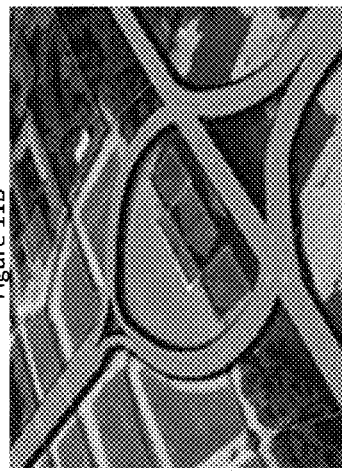
Figure 12A:
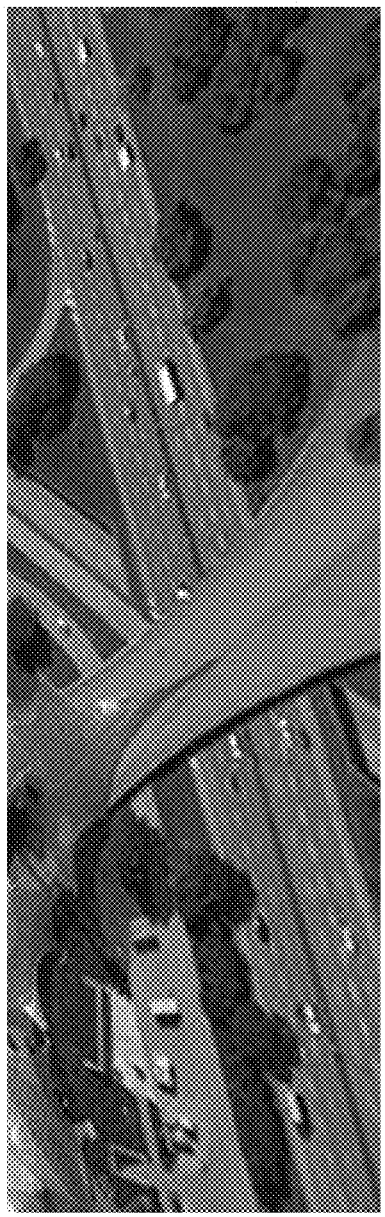
Figure 12B:
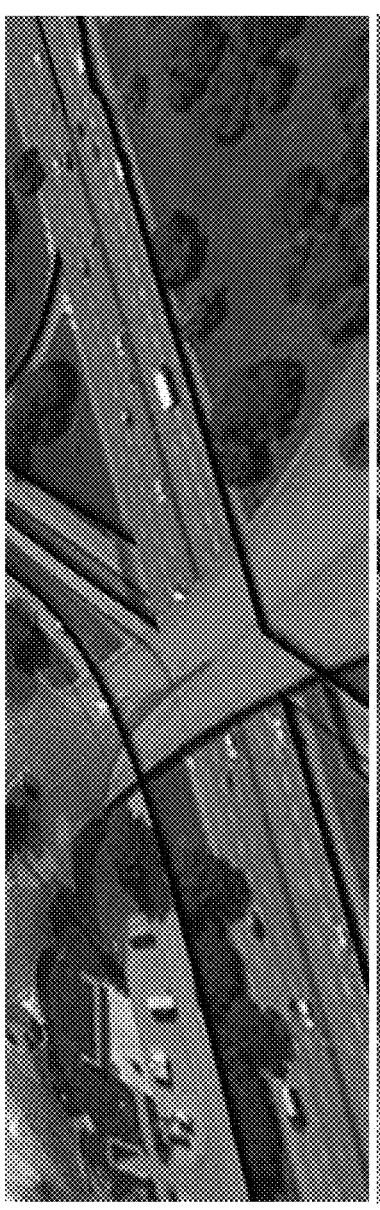
Figure 12C:
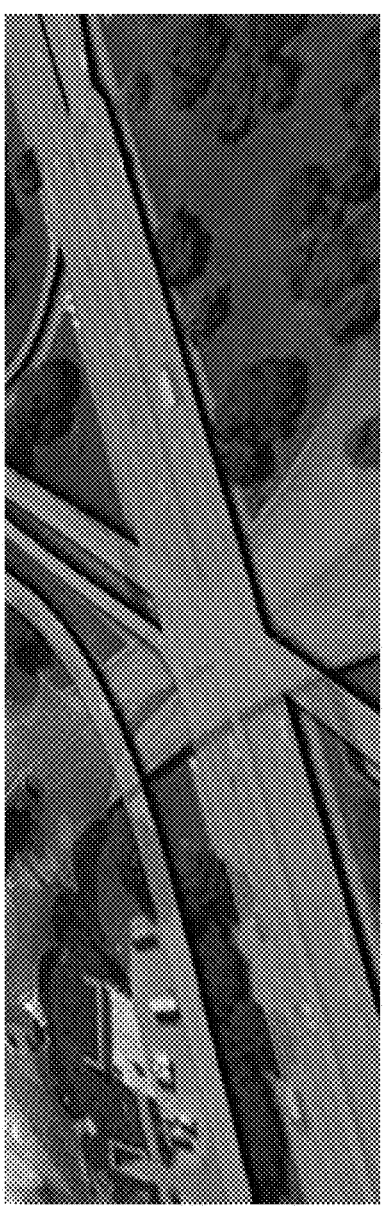
Figure 15A:
Figure 16A:
Figure 17A:

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for generating a composite image based on an ambient occlusion in accordance with an example embodiment of the present invention;

FIGS. 3A and 3B illustrate an example depiction of a generating an composite image in accordance with an embodiment of the present invention;

FIGS. 4A-4E illustrate comparisons of existing example map renderings and a composite image in accordance with an embodiment of the present invention;

FIG. 5 illustrates an example embossing map in accordance with an embodiment of the present invention;

FIG. 6 illustrates an example composite image based on an embossing map and a two dimensional image in accordance with an embodiment of the present invention;

FIG. 7 illustrates an example two dimensional image in accordance with an embodiment of the present invention;

FIGS. 8 through 10 illustrate example embodiments of composite images in accordance with an embodiment of the present invention;

FIGS. 11A-C illustrate transitions between a two dimensional image and the composite image in accordance with an embodiment of the present invention;

FIGS. 12A-C illustrate transitions between a two dimensional image and the composite image in accordance with an embodiment of the present invention;

FIGS. 13A-D illustrate transitions between a two dimensional image and the composite image in accordance with an embodiment of the present invention;

FIGS. 14A-E illustrate example darkness levels of the composite image in accordance with an embodiment of the present invention;

FIGS. 15A and B illustrate comparisons between a two dimensional image and the composite image in accordance with an embodiment of the present invention;

FIGS. 16A and B illustrate comparisons between a two dimensional image and the composite image in accordance with an embodiment of the present invention;

FIGS. 17A and B illustrate comparisons between a two dimensional image and the composite image in accordance with an embodiment of the present invention; and FIG. 18 is a flow chart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment for generating a composite image based on an ambient occlusion. FIG. 1 illustrates a communication diagram including user equipment (UE) 102, in data communication with a map server 104, an image database 106, and/or a geometry model database 108. The UE 102 or map server 104 may include the image database 106 and/or the geometry model database 108, such as a map data memory, or be associated with the image database 106 and/or the geometry model database 108, such as a remote map data server. The UE 102 may be a mobile computing device such as a laptop computer, tablet computer, mobile phone, smart phone, navigation unit, personal data assistant, or the like. Additionally or alternatively the UE 102 may be a fixed computing device, such as a personal computer, computer workstation, kiosk, office terminal computer or system, or the like. The map server 104 may be one or more fixed or mobile computing devices. The map server 104 may be in data communication with the image database 106, the geometry model database 108, and/or one or more UEs 102.

The UE 102 or map server 104 may receive a two dimensional image from the image database 106. The two dimensional image may be any two dimensional depiction of a geographic area or object, such as aerial image or a map. The UE 102 or map server 104 may also receive a geometry model associated with the geographic area or object. Any geometry with varying depth may be used as the geometry model. The geometry model may be a two dimensional geometry model with a vertical layer offset, such as a raised road layer. Additionally or alternatively, the geometry model may be a three dimensional model, such as three dimensional road geometry model, building geometry model, three dimensional aerial light detection and ranging (LiDAR), or the like.

The UE 102 or map server 104 may generate an embossing map based on ambient occlusion associated with the geometry model. The UE 102 or map server 104 may set darkness values based on the heights of surrounding areas of the geometry model. The UE 102 or map server 104 may set a lighter value for areas which are higher than surrounding regions and darker values for areas lower than surrounding regions of the geometry model. For example, the embossing map may be generated based on the ambient occlusion associated with a set of raised two dimensional road links, resulting in "virtual shading" without actually drawing the geometry. In an example in which the geometry model is three dimensional, the heights of the three dimensional regions are used to generate the embossing map, without having to define more complex lighting and shadow models. This process may simulate deep crevasse of the geographic area or object. Since the generation of the embossing map may not need a lighting model it could optionally be performed using a two dimensional depth mesh as the geometry model.

In an example embodiment, the UE 102 or map server 104 may sample surrounding pixels (Si) of each pixel (P) of the geometry model. For each surrounding pixel (Si) which has a relative height higher than the height of pixel P an occlusion weight (O) may be added. The occlusion weight O may be based on the difference between the height of pixel P and the surrounding pixel Si.

The sampling of Si may be performed for a predetermined radius around pixel P. The occlusion weights O of the sampled surrounding pixels Si may be aggregated indicating the amount of ambient light which may reach the pixel P. The process may be repeated for each pixel of the geometry model.

In some example embodiments, such as a road map the occlusion weights may be based on a top down aerial view, e.g. an orthographic view. In an example using an orthographic view the depth values used for the occlusion weights are the height (Z) values of the geometry. In an example embodiment in which a non-orthographic view, such as a three dimensional oblique viewpoint of the geometry model, the heights may be based on the relative distance from the observation point. The ambient occlusion based on the oblique viewpoint may be referred to as a screen space ambient occlusion.

In some example embodiments, certain details of the geometry model may be raised regardless of real world heights, for example all or specified roads may be raised in a road geometry model. This may result in the embossing map having lighter darkness values for the roads, although the roads may actually be at a relatively lower height than the surrounding regions of the geometry model. Raising the roads may result in the road areas having less ambient occlusion; making them standout in the composite image or composite geometry image. In another example, only specific roads, such as a specific route, may be raised to emphasize the route in the composite image or composite geometry image.

The UE 102 or map server 104 may generate an composite image by applying or overlaying the embossing map onto the two dimensional image. The original details of the two dimensional image are preserved, while areas of the two dimensional image are made darker or lighter based on the darkness values associated with the embossing map. The composite image may provide definition, e.g. emphasis, to details of the two dimensional image based on the geometry model. For example, in an instance in which the geometry model is a road geometry model, the two dimensional image is a road map and roads and intersections may be emphasized due to darker embossing near the roads and lighter embossing for the roads. The embossing map may be adjusted by changes in the ambient occlusion range. The ambient occlusion range may be the distance from the current area that the UE 102 or map server 104 is considering in the surrounding region height comparison for darkness value assignment. In an example in which a short ambient occlusion range has been selected, the embossing map may have a short dark embossing near the roads quickly fading to lighter darkness values as the height contrast decreases. In an extended ambient occlusion range, the embossing of the embossing map may be more dispersed, e.g. longer transition area with darker darkness values. The details of the two dimensional image in areas with a darker darkness value of the embossing map may be deemphasized, e.g. some details of the two dimensional image may be in these areas. The emphasis and de-emphasis may simplify the two dimensional image without sacrificing the details of the two dimensional image.

For example, a two dimensional image may consist of a road map with road name labels. A composite image may be created using geographically aligned, e.g. geo-located, geometry models, such as building models and road models. In this example the low areas between the buildings may become darker; roads between tall buildings may become too dark obscuring the road and other details of the two dimensional image. An artificial road geometry model may be generated raising the roads above the height of the buildings. The resulting embossing map may include little ambient occlusion at the road areas since they are the highest regions. The composite image or composite geometry map may include shadowing of the buildings, but the roads and labels on the roads may be , as depicted in FIG. 6.

The UE 102 or map server 104 may generate an composite geometry image. The UE 102 or map server 104 may align and overlay the geometry model over the composite image. The embossing map portion of the composite geometry image allows for a smooth transition from the two dimensional image to the geometry model overlay. In some example embodiments, the embossing may obscure misalignments between the two dimensional image and the geometry model.

In some embodiments, the geometry model may be semi-transparent. The semi-transparent geometry model allows for the details of the two dimensional image to be preserved and rendered in the composite geometry image.

In an example embodiment, the UE 102 or the map server 104 may normalize the embossing map and two dimensional image prior to generation of the composite image. Similarly the UE 102 or the map server 104 may normalize the composite image and the geometry model prior to generating the composite geometry image. Normalization may match the size and pixel intensity of the two dimensional image, embossing map, composite image, and/or the geometry model.

In an example embodiment in which the composite image and/or the composite geometry image is generated at a map server 104, the map server may transmit the composite image and/or the composite geometry image to a UE 102. The transmission may be at a predetermined interval and/or in response to a data request.

The UE 102 may receive or generate the composite image and/or the composite geometry image and render or display the composite image or composite geometry image on a user interface.

Example Apparatus

A UE 102 or map server 104 may include or otherwise be associated with an apparatus 200 as shown in FIG. 2. The apparatus, such as that shown in FIG. 2, is specifically configured in accordance with an example embodiment of the present invention for generating a composite image based on an ambient occlusion. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102 or map server 104. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 110, utility device, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Depiction of Generation of a Composite Image

FIG. 3A illustrates an example depiction of a generating a composite image in accordance with an embodiment of the present invention. The UE 102 or map server 104 may be provided a two dimensional image, such as an aerial image, and a geometry model, such as a HD road geometry model for a geographical area or object. The Geometry model may be a two dimensional road geometry model with a vertical offset or, alternatively, be an overlap three dimensional road geometry model.

The UE 102 or map server 104 may generate an embossing map based the geometry model. As depicted in FIG. 3B, the UE 102 or the map server 104 may assign a brighter or lighter darkness value to areas relatively higher than surrounding, e.g. neighboring, regions and darker darkness values to areas that are relatively lower than the neighboring regions. The relative heights may be based on a height map, depth map, three dimensional modeling, or the like. In an example embodiment, the geometry model is removed leaving the derived embossing map.

The UE 102 or map server 104 may transfer, e.g. overlay, the embossing map on the two dimensional image generating a composite image. The resulting composite image may have an impression or "hint" of three dimensional geometry.

Example Comparison of Example Map Rendering

Figure 4A:
Figure 4B:
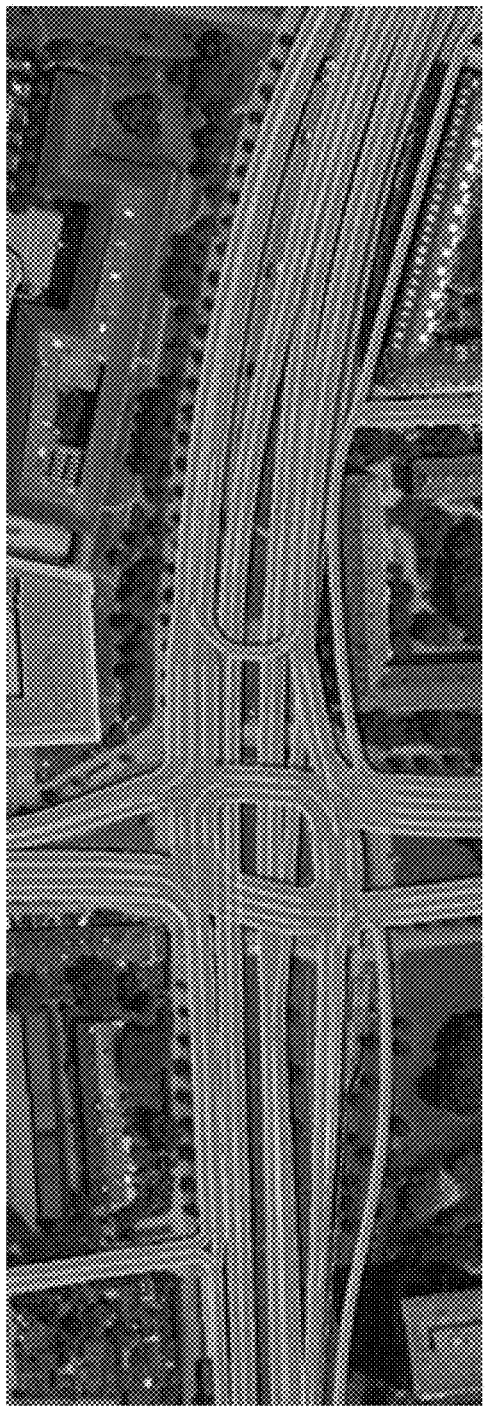
Figure 4C:
Figure 4D:
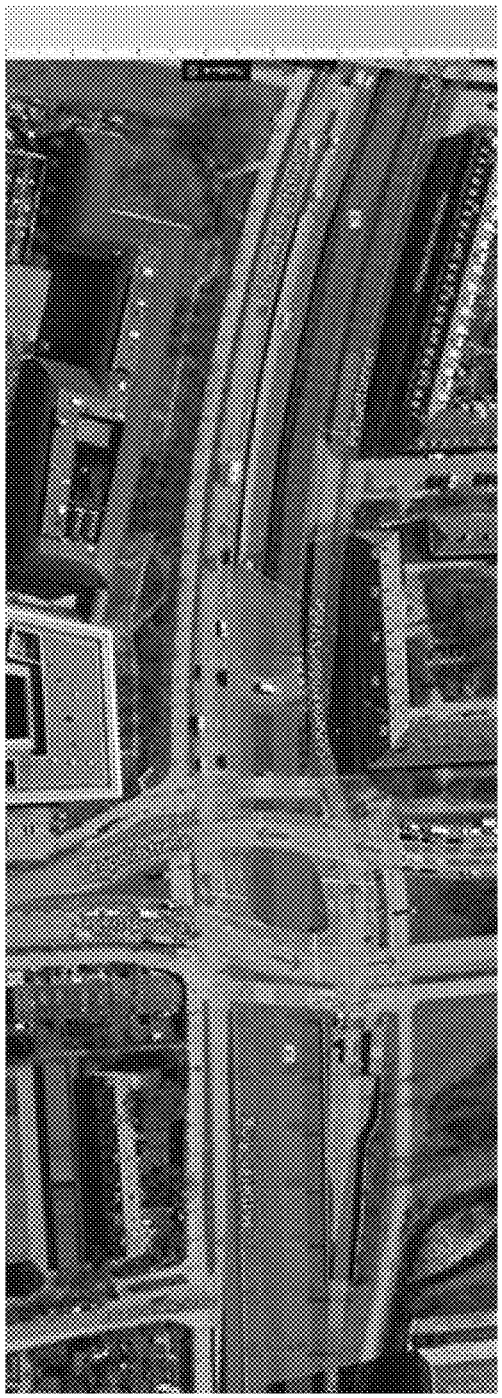
Figure 4E:
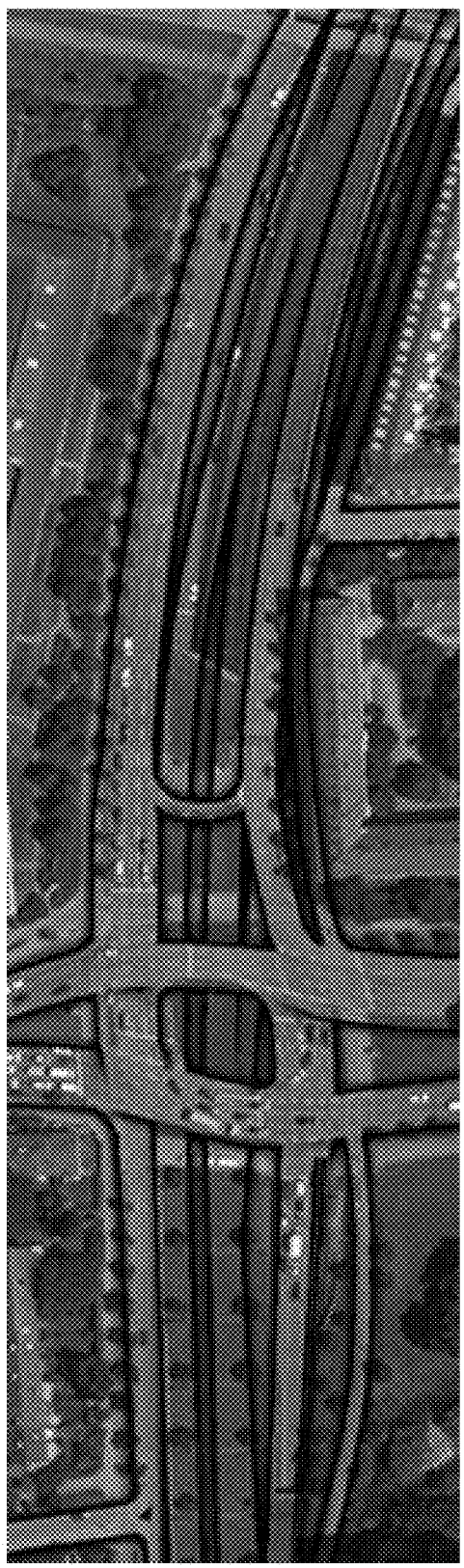

FIGS. 4A-4E represent various map renderings for comparison. FIG. 4A illustrates the original aerial image, e.g. two dimensional image. FIG. 4B depicts a three dimensional geometry model overlay which has obscured important details of the original two dimensional image. FIGS. 4C and 4D depict the three dimensional geometry model as semi-transparent but the rendering may be confusing, due to the lack of edge definition for details, such as roads. FIG. 4E depicts a map rendering in which an embossing map has been applied to the two dimensional image resulting in an composite image. The edges of the roads in the three dimensional geometry model are emphasized and the detail of the original two dimensional image is preserved.

Example Embossing Maps

FIG. 5 illustrates an embossing map resulting from an ambient occlusion of a raised road geometry model. The embossing map highlights, e.g. assigns a lighter darkness value, the raised details, such as roads, with higher relative heights and darkens, e.g. assigns a darker darkness value, to areas with a lower relative heights, e.g. the edge of the roads. As the contrast in height decreases farther from the raised details, lighter darkness values are assigned, resulting in a shading effect. The darkness and radiance of the shading may be adjusted by increasing or decreasing the ambient occlusion range, e.g. the distance which the ambient occlusion height comparison includes as surrounding regions. In an instance in which the ambient occlusion range is short, there may be well defined detail edges with little shading. In an instance in which the ambient occlusion range is disperse, e.g. relatively longer, the edges may be less defined and a long shading area may border the raised detail.

FIG. 6 illustrates a composite image based on a two dimensional map. The embossing map is based on a geometry model with raised roads and aerial LiDAR of buildings. The embossing map is overlaid on the two dimensional map, but the three dimensional geometry model is not rendered. The high points of the buildings are given a light darkness value where the crevices are given a dark darkness values. Additionally, the roads are raised in the height map so that the roads are given a light darkness value regardless of the height associated with the LiDAR. The embossing map may provide extra detail without obscuring the map. For example, FIG. 7 depicts a two dimensional image, e.g. map. FIG. 8 depicts the same two dimensional map with the transferred, e.g. overlaid, embossing map generating an composite image. The original detail of the two dimensional map is preserved, e.g. is still visible, and some areas have been made darker based on the "virtual" road geometry model ambient occlusions. FIG. 9 depicts a composite image similar to FIG. 8 which has a longer, e.g. more dispersed ambient occlusion range. FIG. 10 illustrates an oblique view of the composite image.

Example Transitions Between the Two Dimensional Image and the Composite Geometry Image FIGS. 11A-11C and 12A-12C illustrate transitions between the two dimensional image and the composite geometry image. FIGS. 11A and 12A depict the two dimensional image, which in these examples are aerial images. FIGS. 11B and 12B depict the aerial images which the embossing maps, based on ambient occlusions of a road geometry model, overlaid generating an composite image. The embossing map highlights the road geometry shape, but preserves the two dimensional image details, e.g. lane marking, vehicles, and the like. FIGS. 11C and 12C depict the composite geometry image in which the geometry model, e.g. geo-located road model, is overlaid in the composite image.

Example Transition Between a Two Dimensional Image and an Composite Image

Figure 13A:
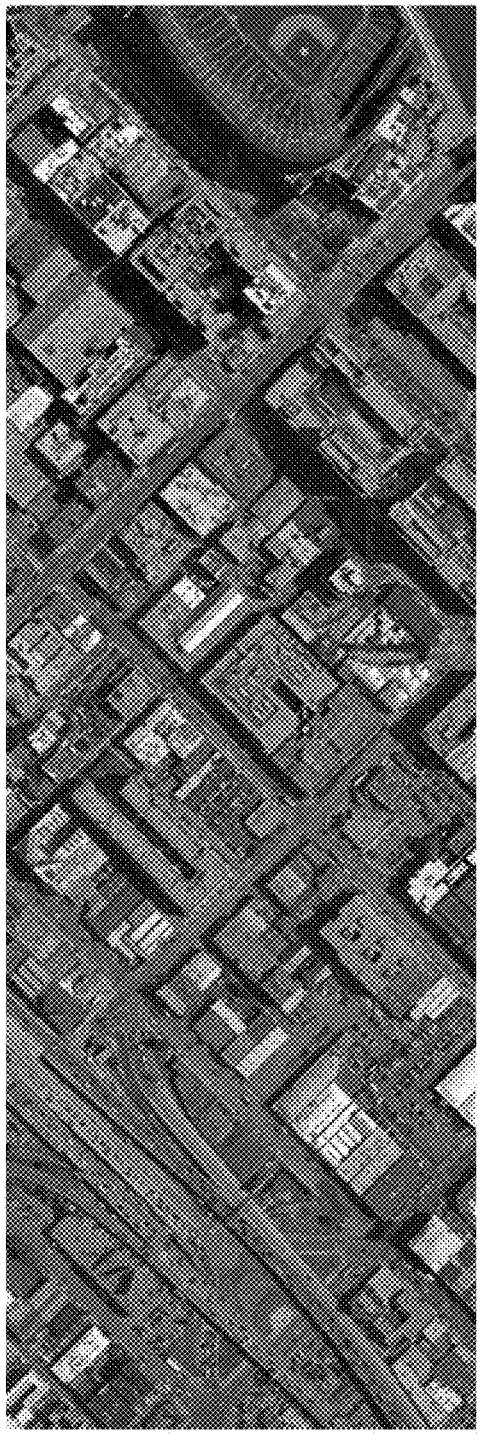
Figure 13B:
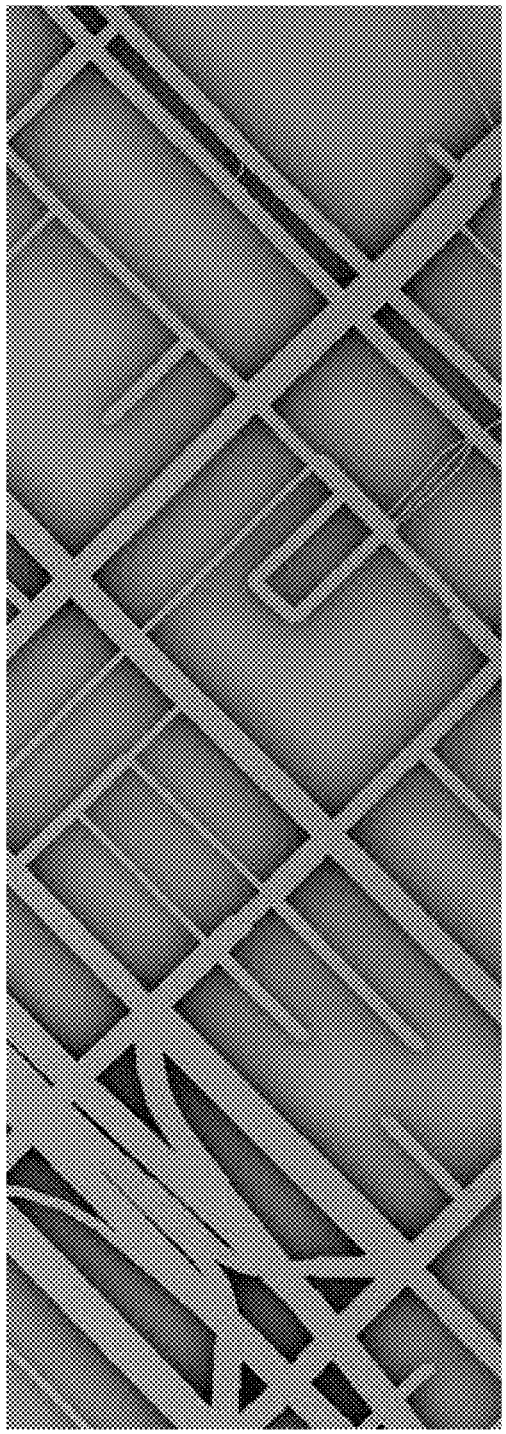
Figure 13C:
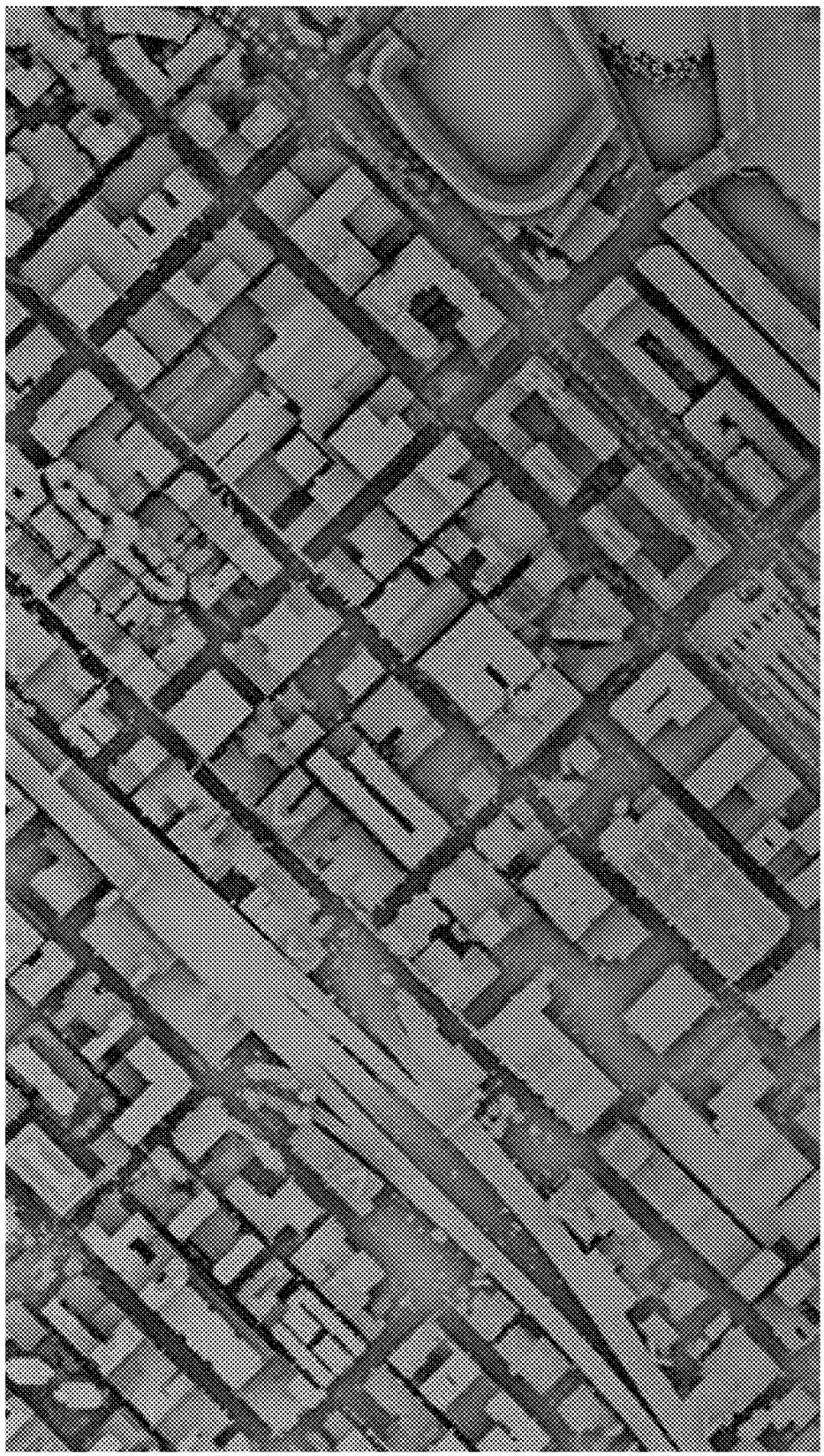
Figure 13D:

FIG. 13A depicts an aerial two dimensional image. FIG. 13B depicts the embossing map based on a raised road layer. FIG. 13C depicts an embossing map based on a three dimensional aerial LiDAR geometry model. FIG. 13D depicts the resulting composite image from the raised road layer embossing map, FIG. 13B and the aerial two dimensional image, FIG. 13A. The complex interchange depicted in the left portion of the composite image is much clearer since the road details are emphasized by the embossing map and the other details are deemphasized while retaining the detail of the two dimensional image.

Example Darkness of Embossing Ambient Transfer Maps

Figure 14A:
Figure 14B:
Figure 14C:
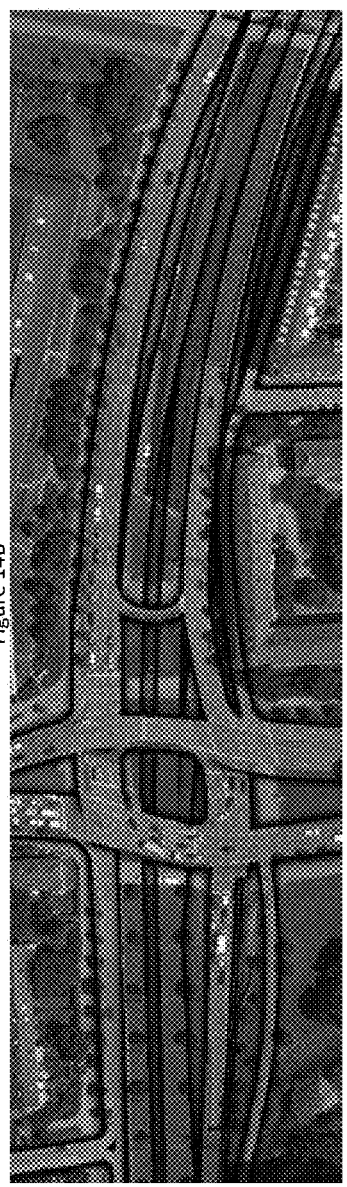
Figure 14D:
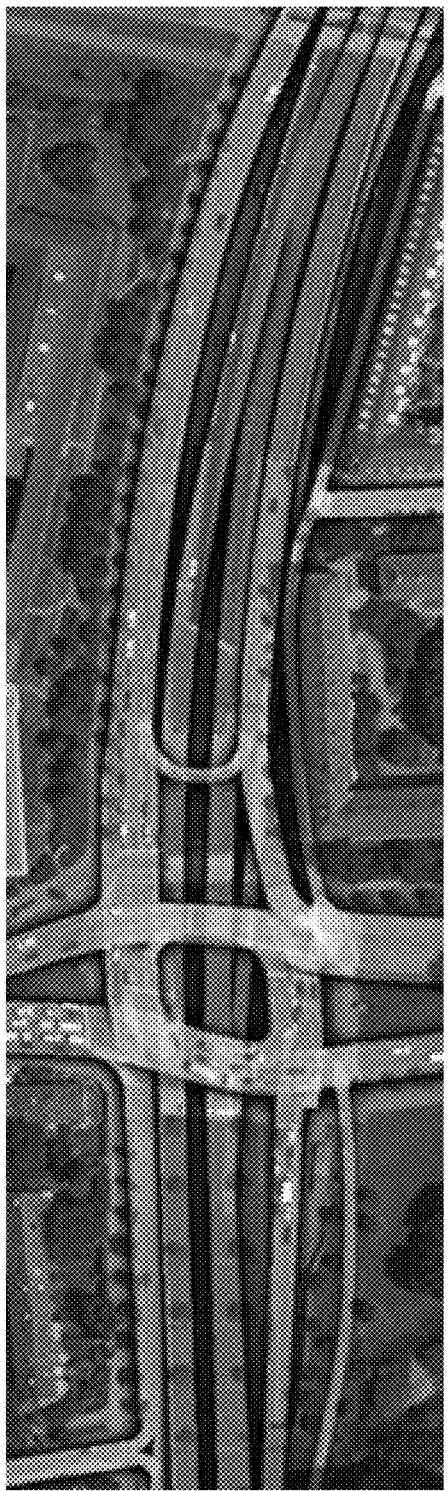
Figure 14E:
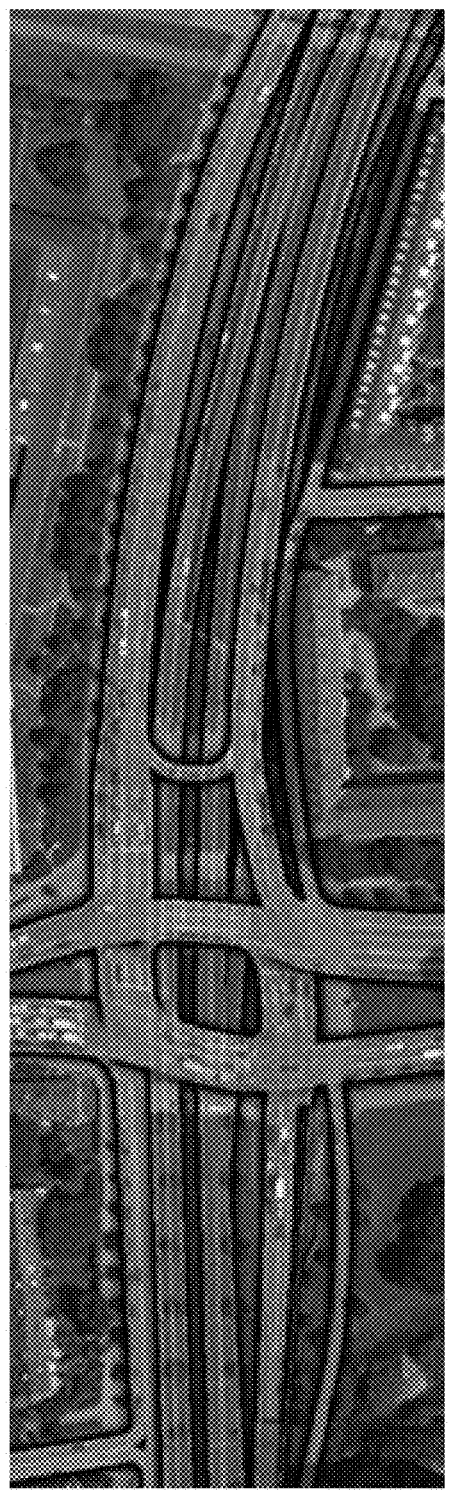

FIGS. 14A-14E illustrate various darkness levels of the embossing in an composite image. FIG. 14A depicts the two dimensional image, e.g. aerial image. FIGS. 14B-14E depict various darkness levels of the embossing map from a lighter embossing at FIG. 14B to a darker embossing at FIG. 14E.

Example Transition Between a Two Dimensional Image and an Composite Image

Figure 15B:

FIGS. 15A-15B, 16A-16B, and 17A-17B illustrate example transitions between two dimensional images and composite images. FIG. 15A depicts a two dimensional image, e.g. aerial image. FIG. 15B depicts a composite image based on the two dimensional image and a embossing map generated based on the ambient occlusions of a three dimensional building model.

Figure 16B:

FIG. 16A depicts a two dimensional image, e.g. aerial image. FIG. 16B depicts a composite image based on the two dimensional image and an embossing map generated based on three dimensional LiDAR geometry model. Details of the two dimensional image are emphasized and therefore more visible, such as the roads and building edges.

Figure 17B:
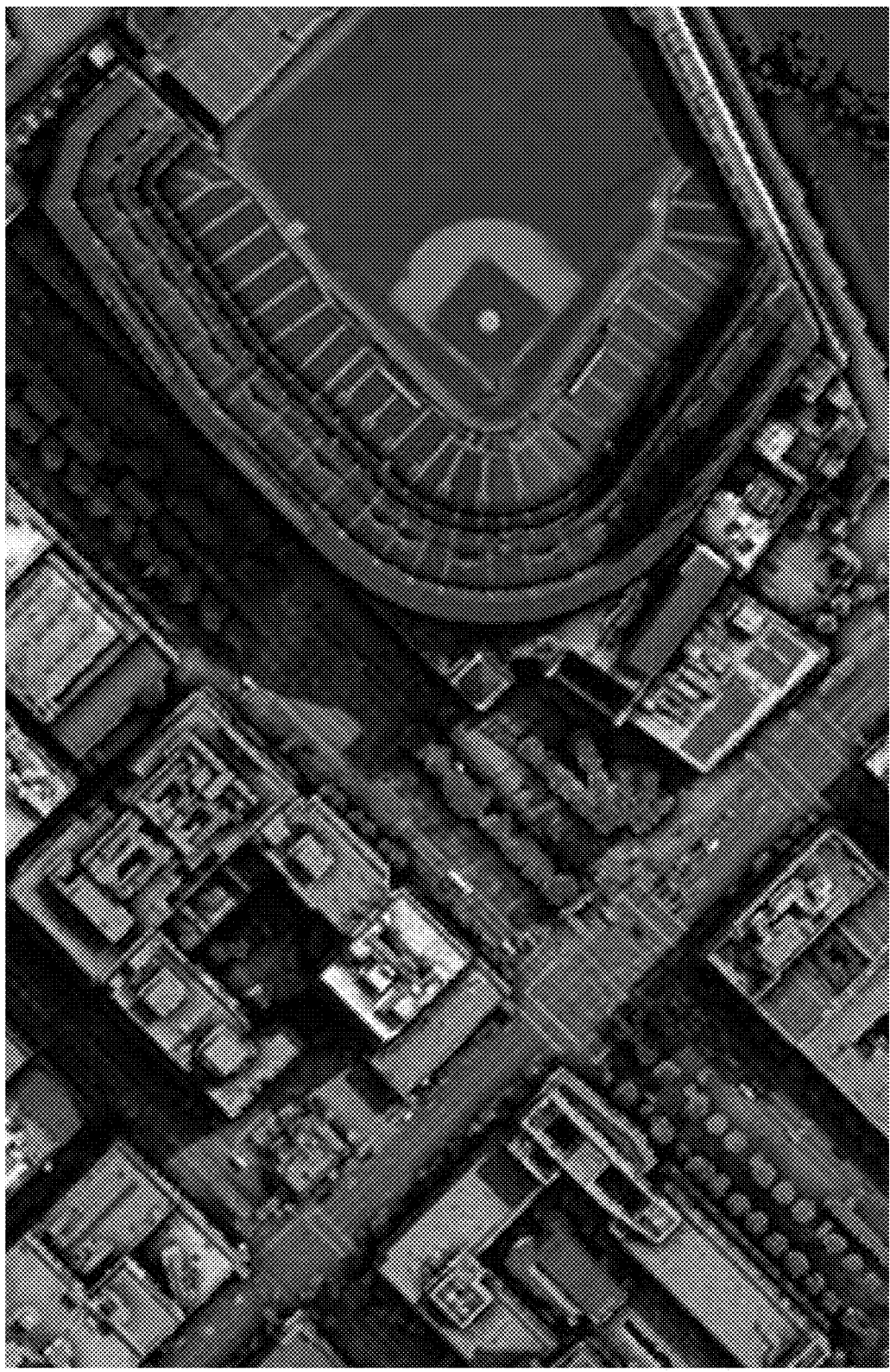

FIG. 17A depicts a two dimensional image, e.g. aerial image. FIG. 17B depicts a composite image based on the two dimensional image and an embossing map generated based on three dimensional LiDAR geometry model. Details of the two dimensional image are emphasized and therefore more visible, such as the trees in the lower left hand corner and the stadium levels.

Example Process for Generating a Composite Image Based on an Ambient Occlusion

Referring now to FIG. 18, the operations performed, such as by the apparatus 200 of FIG. 2, for generating a composite image based on an ambient occlusion are illustrated. As shown in block 1802 of FIG. 18, the apparatus 200 may include means, such as a processor 202, memory 204, a communications interface 206, or the like, configured to receive a two dimensional image. The processor 202 may receive the two dimensional image from the communications interface 206, which in turn, receives the two dimensional image from a server, such as the map server 104, or memory 204, such as the image database 106. The two dimensional image may be a map, aerial image, or the like depicting a geographic area or object.

As shown in block 1804 of FIG. 18, the apparatus 200 may include means, such as a processor 202, a memory 204, a communications module 206, or the like, configured to receive a geometry model. The processor 202 may receive the geometry model from the communications interface 206, which in turn, receives the geometry model from a server, such as the map server 104, or memory 204, such as the geometry model database 106. The geometry model may be associated with the geographic area or object. Any geometry with varying depth may be used as the geometry model. The geometry model may be a two dimensional geometry model with a vertical layer offset, such as a raised road layer. Additionally or alternatively, the geometry model may be a three dimensional model, such as a three dimensional road geometry model, building geometry model, three dimensional aerial LiDAR model or the like.

As shown at block 1806, of FIG. 18, the apparatus 200 may include means, such as a processor 202, or the like, configured to generate an embossing map based on ambient occlusion associated with the geometry model. The UE 102 or map server 104 may set darkness values based on the heights of surrounding areas of the geometry model. The UE 102 or map server 104 may set a lighter value for areas which have higher relative heights than surrounding regions and darker values for areas with lower relative heights than surrounding regions of the geometry model. The embossing map may emphasize higher details and deemphasize lower details.

In some embodiments the heights of certain details may be adjusted so that these details are highlighted or emphasized, such as roads. The level of emphasis, e.g. the embossing map may be adjusted by changes in the ambient occlusion range, for example, a short ambient occlusion range may have a short dark embossing of the embossing map near the roads. In an extended ambient occlusion range, the embossing of the embossing map may be more dispersed. In some embodiments, these height adjustments may based on model attributes, such as raods, including function class, road type, speed limit, or the like. In some embodiments, the height adjustments may be based on a defined route, for example only road elevations along the defined route are changed. In some embodiments, the height adjustments may be based on the proximity to a particular point of interest, such as a building. In some embodiments, thee height adjustments may be based on the proximity to the current global position system (GPS) location of the user.

In an example embodiment, the processor 202 may normalize the embossing map and the two dimensional image. The processor may match the size and/or the pixel intensity of the embossing map and the two dimensional image.

As shown at block 1808 of FIG. 18, the apparatus 200 may include means, such as a processor 202, or the like, configured to generate a composite image based on the two dimensional image and the embossing map. The processor 202 may generate the composite image by applying or overlaying the embossing map onto the two dimensional image. The original details of the two dimensional image are preserved, while areas of the two dimensional image are made darker or lighter based on the darkness values associated with the embossing map. The embossed transfer map may provide definition to details of the two dimensional image based on the geometry model. For example in an instance in which the geometry model is a road geometry model the two dimensional image is a road map, roads and intersections may be emphasized due to darker embossing near the roads and lighter embossing for the roads.

In an example embodiment, the processor 202 may normalize the composite image and the geometry model. The processor may match the size and/or the pixel intensity of the composite image and the geometry model.

As shown at block 1810 of FIG. 18, the apparatus 200 may include means, such as a processor 202, or the like, configured to generate a composite geometry image based on the composite image and the geometry model. The processor 202 may generate the composite geometry image by aligning and overlaying the geometry model over the composite image. The embossing map portion of the composite geometry image allows for a smooth transition from the two dimensional image to the geometry model overlay. In some example embodiments, the embossing may obscure misalignments between the two dimensional image and the geometry model.

In some embodiments, the geometry model may be semi-transparent. The semi-transparent geometry model allows for the details of the two dimensional image to be preserved and rendered in the composite geometry image.

As shown at block 1812 of FIG. 18, the apparatus 200 may include means, such as a processor 202, communication interface 206, or the like, configured to cause the transmission of the composite image and/or the composite geometry image. In an instance in which the composite image and/or the composite geometry image is generated by a first apparatus 200, such as a map server 200, for display on a second apparatus, such as a UE 102, the processor 202 may cause the communications interface 206 to transmit the composite image and/or the composite geometry image to the second apparatus. The transmission of the composite image and/or the composite geometry image may be at a predetermined interval or in response to a data request.

As shown at block 1814 of FIG. 18, the apparatus 200 may include means, such as a processor 202, communication interface 206, or the like, configured to receive the composite image and/or the composite geometry image. The processor 202 may receive the composite image and/or the composite geometry image from the communications interface 206, which in turn, receives the composite image and/or the composite geometry image from another apparatus 200, such as a map server 104.

As shown at block 1816 of FIG. 18, the apparatus 200 may include means, such as a processor 202, user interface 208, or the like, configured to cause the composite image and/or the composite geometry image to be displayed on a user interface.

The composite image may render a map which emphasized the real world or map based image, e.g. the two dimensional image with three dimensional modeling. The composite image may highlight and shade the two dimensional image while preserving the details of the two dimensional image. The embossing in the composite geometry image may obscure misalignments between the two dimensional image and the geometry model and provide a smooth transition for the addition of geometry models, such as three dimensional road, and building models.

As described above, FIG. 18 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of block 1810, 1812, 1814, and 1816 in FIG. 18. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodi- That which is claimed:

1. A method comprising:
receiving a two dimensional image associated with a geographic area or object;
receiving a geometry model associated with the geographic area, wherein the geometry model comprises a plurality of elements, an element of the plurality of elements is associated with one or more attributes;
generating, by a processor, an embossing map based on ambient occlusions associated with the geometry model, wherein an ambient occlusion range selected for application to an element of the plurality of elements is based on at least one of the one or more attributes corresponding to the element and wherein the ambient occlusion range defines a transition area about the element in the embossing map; and
generating a composite image based on the two dimensional image and the embossing map.

2. The method of claim 1 further comprising:
generating a composite geometry image based on the composite image and the geometry model.

3. The method of claim 2, wherein the composite geometry image comprises the geometry model overlaid on the composite image and the geometry model of the composite geometry image is semi-transparent.

4. The method of claim 1, wherein generating the embossing map comprises:
setting darkness values based on a height of surrounding regions of the geometry model.

5. The method of claim 1, wherein the geometry model is a three dimensional model.

6. The method of claim 1, wherein the geometry model is a two dimensional model comprising one or more vertical layer offsets.

7. The method of claim 1, wherein generating the composite image preserves two dimensional image details.

8. An apparatus comprising at least one processor and at least one memory including computer program code, the at least one memory and computer program code configured to, with the processor, cause the apparatus to at least:
receive a two dimensional image associated with a geographic area or object;
receive a geometry model associated with the geographic area, wherein the geometry model comprises a plurality of elements, an element of the plurality of elements is associated with one or more attributes;
generate an embossing map based on ambient occlusions associated with the geometry model, wherein an ambient occlusion range selected for application to an element of the plurality of elements is based on at least one of the one or more attributes corresponding to the element and wherein the ambient occlusion range defines a transition area about the element in the embossing map; and
generate a composite image based on the two dimensional image and the embossing map.

9. The apparatus of claim 8, wherein the at least one memory and the computer program code are further configured to:
generate a composite geometry image based on the composite image and the geometry model.

10. The apparatus of claim 9, wherein the composite geometry image comprises the geometry model overlaid on the composite image and the geometry model of the composite geometry image is semi-transparent.

11. The apparatus of claim 8, wherein generating the embossing map comprises:
setting darkness values based on a height of surrounding regions of the geometry model.

12. The apparatus of claim 8, wherein the geometry model is a three dimensional model.

13. The apparatus of claim 8, wherein the geometry model is a two dimensional model comprising one or more vertical layer offsets.

14. The apparatus of claim 8, wherein generating the composite image preserves two dimensional image details.

15. A computer program product comprising at least one non-transitory computer-readable storage medium having computer-executable program code portions stored therein, the computer-executable program code portions comprising program code instructions configured to:
receive a two dimensional image associated with a geographic area or object;
receive a geometry model associated with the geographic area, wherein the geometry model comprises a plurality of elements, an element of the plurality of elements is associated with one or more attributes;
generate an embossing map based on ambient occlusions associated with the geometry model, wherein an ambient occlusion range selected for application to an element of the plurality of elements is based on at least one of the one or more attributes corresponding to the element and wherein the ambient occlusion range defines a transition area about the element in the embossing map; and
generate a composite image based on the two dimensional image and the embossing map.

16. The computer program product of claim 15, wherein the computer-executable program code portions further comprise program code instructions configured to:
generate a composite geometry image based on the composite image and the geometry model.

17. The computer program product of claim 16, wherein the composite geometry image comprises the geometry model overlaid on the composite image and the geometry model of the composite geometry image is semi-transparent.

18. The computer program product of claim 15, wherein generating the embossing map comprises:
setting darkness values based on a height of surrounding regions of the geometry model.

19. The computer program product of claim 15, wherein the geometry model is a three dimensional model.

20. The computer program product of claim 15, wherein the geometry model is a two dimensional model comprising one or more vertical layer offsets.

* * * * *